United States Patent
Gazyakan et al.

(10) Patent No.: US 6,783,475 B2
(45) Date of Patent: Aug. 31, 2004

(54) ALL-WHEEL DISTRIBUTOR GEARBOX FOR A MOTOR VEHICLE

(75) Inventors: Ünal Gazyakan, Friedrichshafen (DE); Detlef Baasch, Friedrichshafen (DE); Gerhard Gumpoltsberger, Friedrichshafen (DE); Michael Ebenhoch, Friedrichshafen (DE); Barbara Schmohl, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/415,911
(22) PCT Filed: Nov. 21, 2001
(86) PCT No.: PCT/EP01/13504
§ 371 (c)(1),
(2), (4) Date: May 5, 2003
(87) PCT Pub. No.: WO02/42663
PCT Pub. Date: May 30, 2002

(65) Prior Publication Data
US 2004/0018908 A1 Jan. 29, 2004

(30) Foreign Application Priority Data
Nov. 23, 2000 (DE) .......................................... 100 58 198

(51) Int. Cl.⁷ .......................... F16H 37/02; B60K 17/35
(52) U.S. Cl. ...................... 475/210; 475/213; 475/303; 192/84.6; 180/249
(58) Field of Search ............................... 475/210–213, 475/149, 303; 192/84.6, 84.1; 180/247–249

(56) References Cited

U.S. PATENT DOCUMENTS

| | | | |
|---|---|---|---|
| 4,804,061 A | 2/1989 | Kameda | 180/247 |
| 5,199,325 A * | 4/1993 | Reuter et al. | 74/335 |
| 5,951,429 A | 9/1999 | Eastman | 475/204 |
| 6,022,289 A | 2/2000 | Francis | 475/320 |
| 6,071,207 A | 6/2000 | Stephens et al. | 475/204 |
| 6,099,430 A * | 8/2000 | Winks | 475/204 |
| 6,101,897 A | 8/2000 | Showalter | 74/665 GE |
| 6,602,159 B1 * | 8/2003 | Williams | 475/303 |
| 6,712,729 B2 * | 3/2004 | Stephens et al. | 475/204 |

FOREIGN PATENT DOCUMENTS

| | | | |
|---|---|---|---|
| EP | 0 943 479 A1 | 9/1999 | B60K/17/346 |
| EP | 1 040 955 A2 | 10/2000 | B60K/17/35 |

* cited by examiner

Primary Examiner—Tisha Lewis
(74) Attorney, Agent, or Firm—Davis & Bujold, P.L.L.C.

(57) ABSTRACT

An all-wheel distributor transmission (1) is described for a motor vehicle comprising a planetary gear set as multiplication step (2) for a switchable off-road gear and a planetary gear set (3) with variable division for distributing a drive torque onto a front axle and a rear axle. The all-wheel distributor transmission (1) also has an adjustable lock (4) for locking between the front axle and the rear axle, the lock (4) and the multiplication step (2) being actuatable via a controllable drive device (5). The drive device (5) comprises a drive shaft (6) and two output shafts (7, 8), the first output shaft (7) being in operative connection with the multiplication step (2) and the second output shaft (8) being in operative connection with the lock (4). A torque introduced via the drive shaft (6) can be applied on the first or the second output shaft (7 or 8) according to a control of a shift unit (10) for actuating the lock (4) or the multiplication step (2).

19 Claims, 3 Drawing Sheets

ALL-WHEEL DISTRIBUTOR GEARBOX FOR A MOTOR VEHICLE

FIELD OF THE INVENTION

The invention relates to an all-wheel distributor transmission of a motor vehicle.

BACKGROUND OF THE INVENTION

In all-wheel distribution transmissions for motor vehicles known from the practice, a planetary gear set as multiplication step for a switchable off-road gear and an adjustable block for locking between a front axle and a rear axle of the motor vehicle are respectively actuated independently of each other via two separate actuators or electromotors.

However, those all-wheel distributor transmissions with devices for actuating an off-road gearshift and an adjustable lock have the disadvantage of needing a large installation space and working in opposition to the general requirement in motor vehicle technology of a weight reduction to minimize the fuel consumption.

In U.S. Pat. No. 6,022,289 has been described an all-wheel distributor transmission of a motor vehicle in which an off-road gearshift and a lock are actuated via a common drive device. The lock designed here as multi-disc lock is brought by an actuator of the drive device via a lever arm from an open position to a closed position and at the same time to a position that locks a front-wheel input with a rear-wheel input. The off-road gearshift is actuated via a cam disc which converts a rotatory input originating from the actuator to a translatory movement or actuation of the off-road gearshift.

The lock is opened and closed and the off-road gear is engaged or disengaged via the respective direction of rotation of the actuator and of the electromotor corresponding therewith. This means, for example, that a clockwise rotation of the electromotor produces an adjustment of the off-road gear in a shifting position or an adjustment of the multi-disc lock in a closing position. The disengagement of the off-road gear or a locking of the multi-disc lock is produced, for example, by a counterclockwise rotation of the electromotor.

It is here disadvantageous, however, that the different directions of rotation of the electromotor needed for actuation of the multi-disc lock and of the off-road gearshift over their respective overall range of operation cause during the reversal of direction of rotation, a so-called upset play which, specifically in the control of the input for the multi-disc lock, makes only unsatisfactorily possible an exact adjustment of an applied pressure.

It is also disadvantageous that the compression of the discs during the closing or in closed position of the multi-disc lock due to a bending of the lever cannot be exactly defined, since while the discs are compressed, the driving energy of the actuator applied to the multi-disc clutch is partly consumed as lost energy by the deformation of the lever and an exact relationship no longer exists between the compression and the rotation angle of the actuator and the drive shaft thereof respectively.

The problem on which this invention is based is, therefore, to make available an all-wheel distributor transmission for a motor vehicle which needs small installation space and with which can be carried out an exact actuation of an off-road gearshift and of a lock of the all-wheel distributor transmission.

SUMMARY OF THE INVENTION

With the inventive all-wheel distributor transmission the constructional expenses and the number of parts are advantageously reduced, since the actuation of the lock and of the off-road gearshift is implemented via a single drive device. The possible compact and low-wear design economizes both installation space and weight and also costs by the reduction of the required parts.

By the fact that the lock and the clutch for the planetary gear set, which serves as multiplication step for the switchable off-road gear, can be actuated via a common drive device and a torque of the drive shaft of the drive device is applied upon the first drive shaft or the second drive shaft of the drive device depending respectively on a control of the switching device for actuation of the lock or of the multiplication step, the expense for control and regulation of the alternative actuation of the lock and of the off-road gearshift is considerably reduced. This advantage results from the fact that there are controlled only one machine such as an electromotor of the drive device that produces the drive torque and only one switching device for rerouting the drive torque from the drive shaft to one of the two drive shafts.

BRIEF DESCRIPTION OF THE DRAWINGS

The invention will now be described, by way of example, with reference to the accompanying drawings in which.

DETAILED DESCRIPTION OF THE INVENTION

Figure 1:
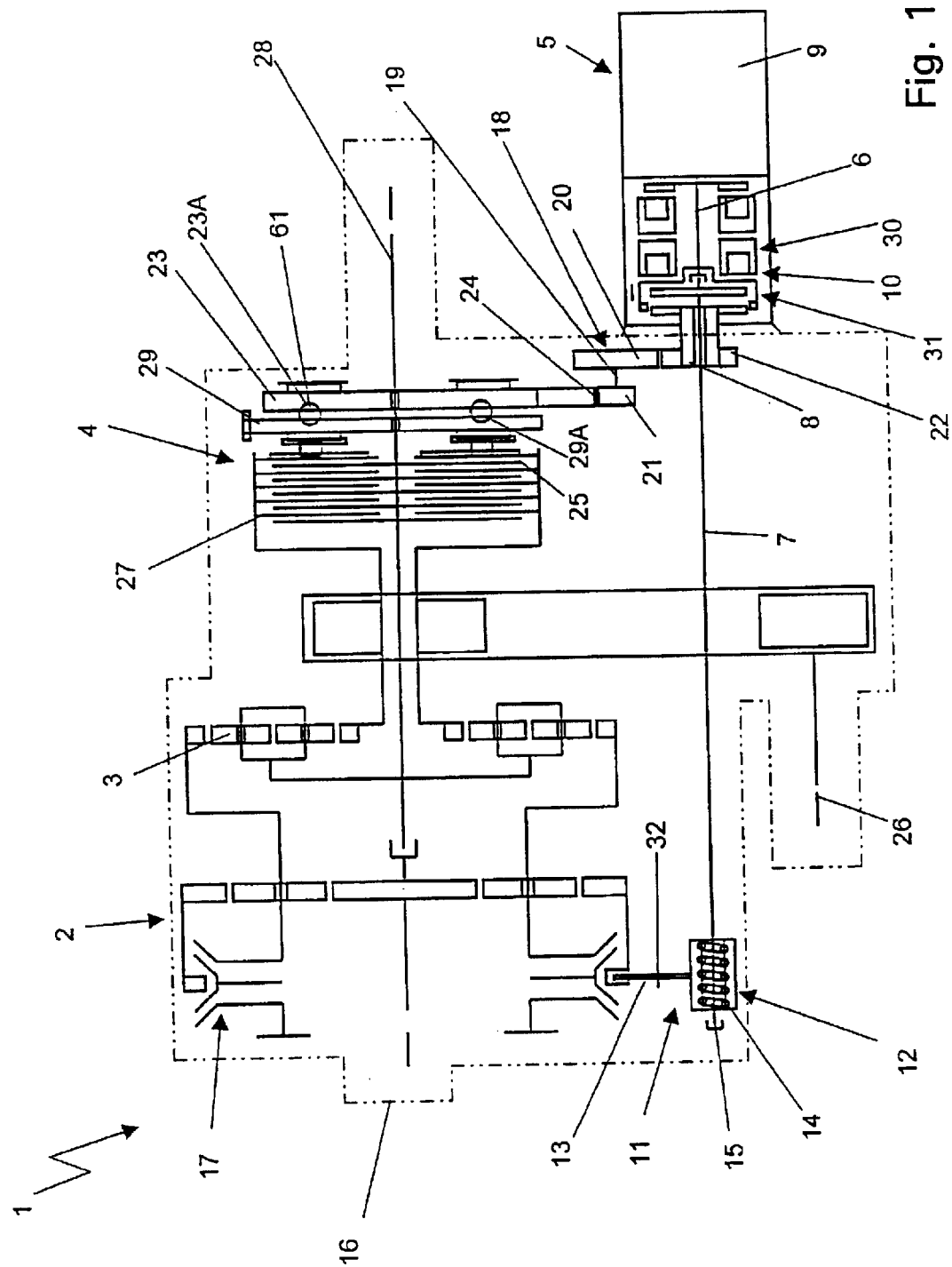
FIG. 1 is a schematic representation of an inventive all-wheel distributor transmission of a motor vehicle with an off-road gearshift and a multi-disc lock.

Referring to FIG. 1, it shows a schematic representation of an all-wheel distributor transmission 1 for a motor vehicle with a first planetary gear set as multiplication step 2 for a switchable off-road gear and a second planetary gear set 3 with variable division for distribution of a drive torque onto a front axle and a rear axle. The all-wheel distributor transmission 1 further comprises an adjustable lock 4 for locking between a front-axle output line and a rear-wheel output line, the lock 4 and the multiplication step 2 being actuatable via a controllable drive device 5.

The drive device 5 comprises one drive shaft 6 and two output shafts 7, 8, the first output shaft 7 being in operative connection with the multiplication step 2 and the second output shaft 8 in operative connection with the lock 4. The drive shaft 6 constitutes at the same time an output shaft of an electromotor 9 of the drive device 5 and transmits during operation of the electromotor 9 a torque which, depending on a control of a shift unit 10 of the drive device 5 for actuating the lock 4 or the multiplication step 2, can be brought from the drive shaft 6 to the first output shaft 7 or the second output shaft 8.

In the area of its end remote from the drive shaft 6, the first output shaft 7 is in operative connection with a linear drive 11 which has a ball-threaded pinion 12 and a tiltable drive 13. The ball-threaded pinion 12 comprises a ball nut 15 having several balls 14 which engages in a spindle-like area of the first output shaft 7 and upon a rotation of the first output shaft 7 is adjusted in the axial direction thereof and produces a tilting motion of the driver 13. In the design shown, the ball nut 15, during a counterclockwise rotation of the electromotor 9, is displaced in axial direction of the first output shaft 7 toward a drive device 5 and during a clockwise rotation of the electromotor 9 is adjusted in an opposite direction.

The driver 13 is tiltably mounted in a housing 16 of the all-wheel distributor transmission 1 and connected with a synchronizer unit 17 of the multiplication step 2, a tilting motion of the driver 13 producing a translatory movement of the gear change sleeve of the synchronizer unit 17.

It is understood that in an alternative embodiment the expert can also provide instead of the driver 13 shown here a non-tiltable fork rigidly connected with the linear drive.

In its end remote from the drive shaft 6, the second output shaft 9 is in operative connection with the lock 4 via a multiplication device 18, said multiplication device 18 being firmly connected with a shaft 19 and having in the housing 16 rotatably disposed gear wheels 20, 21. The first gear wheel 29 of the shaft 19 engages with a spur wheel 22 firmly connected with the second output shaft 8.

The lock 4 as a set wheel 23 which is provided with a spline 24 that partly extends over the periphery of the set wheel 23 and is engaged with the second gear wheel 21 of the shaft 19.

The lock 4 further comprises several axially movable discs, the inner discs 25 of the lock 4 being non-rotatably connected with a rear-wheel output shaft 28 of the all-wheel distributor transmission 1 and outer discs 27 of the lock 4 being non-rotatably connected with a front-wheel output shaft 26 of the all-wheel distributor transmission 1.

Between the disc sets 25, 27 and the set wheel 23 there is provided a disc-like adjusting element 29 axially movable and firmly disposed in the housing 16 of the all-wheel distributor transmission 1 and having on its side facing the set wheel 23 spiral shaped grooves 29A whose depth steadily increases in the manner of a sloping path until a maximum depth point. The set wheel 23 in addition has upon its side facing the adjusting element 29 spiral-shaped recesses 23A corresponding with the grooves 29A of the adjusting element 29, rolling bodies 61 being passed between the set wheel 23 and the adjusting element 29 into the grooves 29A and the recesses 23A.

The set wheel 23 forms with the adjusting element 29 and the rolling bodies or balls 61 disposed therebetween a ball-ramp system wherein the grooves 29A and the recesses 23A are mutually disposed so that a rotation of the set wheel 23 produces a hobbing of the rolling bodies 61 in the grooves 29A and the recesses 23A, the same as an axial movement of the adjusting element towards or away from the disc sets 25, 27 when the set wheel 23 is axially stationary. The rotation of the set wheel 23 is produced by the transmission of the drive torque originating from the drive device 5 to the set wheel 23 via the multiplication device 18.

This construction, in which small flexible parts are used, is characterized by a very advantageous hysteresis behavior with small hysteresis whereby a very precise adjustment of the multi-disc lock 5 is possible.

The shift unit 10 of the drive device 5 comprises an electromagnetic clutch 30 with which a power flow can be produced between the drive shaft 6 and the first output shaft 7 or the second output shaft 8. To form the power flow, the electromagnetic clutch 30 is furnished with an axially and rotatorily movable guided coupling element 31 which is non-rotatably connected with the drive shaft 6, and depending on a current supply of the electromagnetic clutch 30, produces the power flow between the drive shaft 6 and the first output shaft 7 or the second output shaft 8.

In the operation of the electromotor 9 and when the electromagnetic clutch 30 is controlled to produce a power flow between the drive shaft 6 and the first output shaft 7, there takes place an actuation of the off-road gearshift 2 via the linear drive 11 when the off-road gear is not engaged during a counterclockwise rotation of the electromotor in the sense that the ball-threaded pinion 12 is displaced in axial direction of the first output shaft 7, a tilting motion of the drive 13 having as consequence a translatory movement of the gear change sleeve of the synchronizer unit 17. During clockwise rotation of the electromotor 9, when power flow exists between the drive shaft 6 and the first output shaft 7, the gear change sleeve of the synchronizer unit 17 is again adjusted via the linear drive 11 back to the neutral position shown in FIG. 1.

On the other hand, if the electromagnetic clutch 30 is controlled so that a power flow exists between the drive shaft 6 and the second output shaft 8, the drive torque of the electromotor 9 transmitted by the drive shaft 6 to the second output shaft 8 produces a rotation of the set wheel 23 which, in turn, results in a translatory motion of the adjustment element 29 of the lock 4 to be closed in direction of the disc sets 25, 27.

If the power flow between the drive shaft 6 and the second output shaft 8 is cut off or the electromotor 9 shifts without current, a spring device (not shown in detail) of the lock 4 exerts a recoil force upon the disc sets 25, 27 which, in turn, produces a translatory motion of the adjusting element 29 in direction of the set wheel 23 for opening the lock 4.

By the fact that the multi-disc lock 4 is always brought from an open to a closed or locking position by a direction of movement or direction of rotation of the electromotor 9, only a small expenditure is needed for adjustment.

When the front-wheel output shaft 26 and the rear-wheel output shaft 28 are to be locked with each other, the lock 4 is closed via the drive device 5 and subsequently held in locking position by the electromotor 9 as long as required. When the locking cation of the lock 4 is again to be cut off, either the power flow between the second output shaft 8 and the drive shaft 6 is cut off via the electromagnetic clutch 30 or the electromotor 9 shifts currentless, the spring device of the lock 4 acting as above described in axial direction of the rear-wheel output shaft 28 upon the adjusting element 29. By virtue of the configuration of the grooves 29A of the adjusting element 29 and the recesses 29A of the set wheel 23 and the rolling bodies or balls 61 situated therebetween, the set wheel 23 is reset in rotation and the lock 4 is opened.

Figure 2:
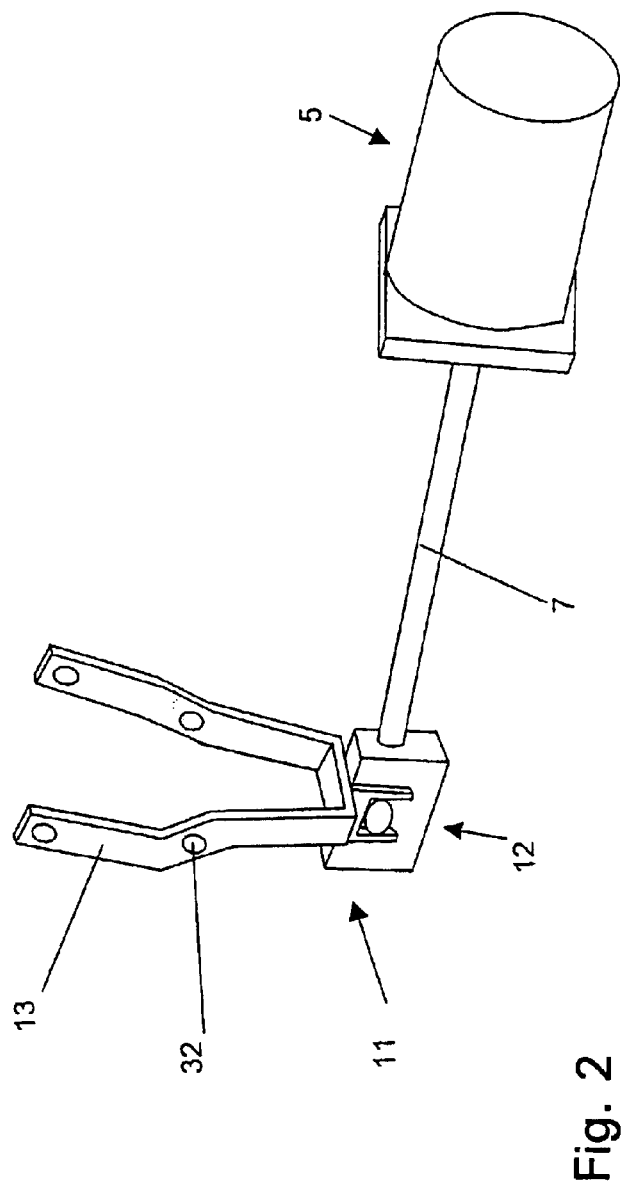
FIG. 2 is a simplified representation of a drive device of the all-wheel distributor transmission according to FIG. 1 which is in operative connection with a linear drive for the off-road gearshift.

FIG. 2 shows the drive device 5 with the linear drive 11 in detached position and must make clear the mode of operation of the linear drive 11 and the tilting motion of the drive 13 as result of an axial adjustment of the ball-threaded pinion 12. The driver 13 is non-rotatably supported in the housing 16 on a rotation point 32 and on its end facing the first output shaft 7 is rotatably connected with the ball-threaded pinion 12. On its end remote from the ball-threaded pinion 12, the drive 13 is connected with the synchronizer unit 17 shown in FIG. 1 and during rotation around the rotation point 32 produces a translatory movement of the sliding sleeve of the synchronizer unit 17. The end of the driver 13 remote from the ball-threaded pinion 12 undergoes here, in axial direction of the first output shaft 7, a deflection which leads to the adjustment of the sliding sleeve of the synchronizer unit 17 and an engagement or disengagement of the off-road gear.

Figure 3:
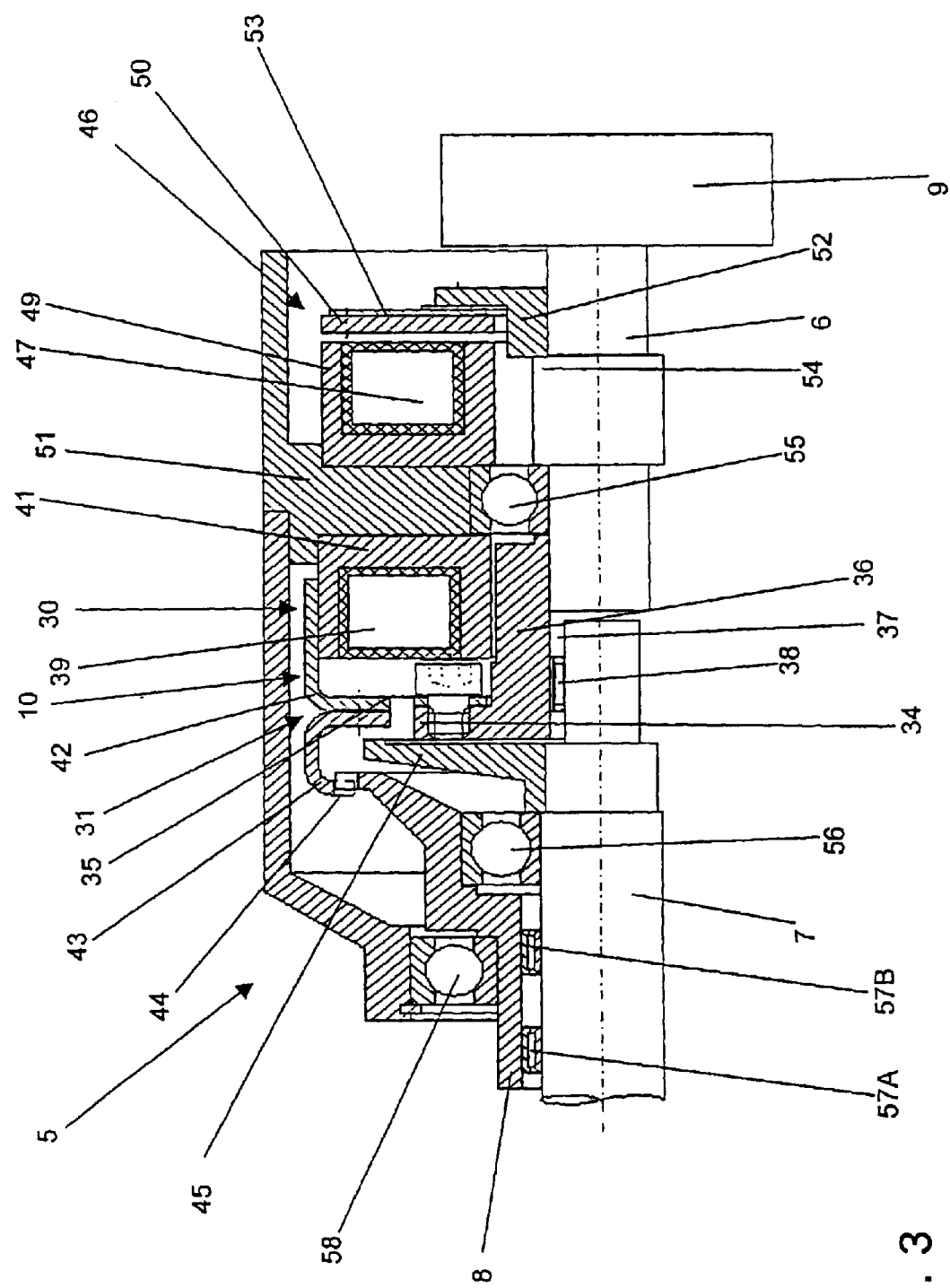
FIG. 3 is a half section through the drive device according to FIG. 1 and FIG. 2 with an electromagnetic clutch and an electromagnetic brake in detached representation.

FIG. 3 shows the drive device 5 in detached position where the drive shaft 6 is designed in the area of its end facing the output shafts 7, 8 with a flange-like collar 34 on which a resilient element 35 of the coupling element 31 designed here as leaf spring or diaphragm spring is non-rotatably fastened.

In the instant embodiment the flange-like collar 34 is designed integrally with a hollow cylindrical part 36 firmly connected with the drive shaft 6, the connection being provided between the hollow cylindrical part 36 and the drive shaft 6 in the area of the end of the hollow cylindrical part 36 remote from the output shafts 7,8 and the area of the end of the drive shaft 6 facing the output shafts 7, 8. The hollow cylindrical part 36 extends in axial direction of the drive shaft 6 so that the first output shaft 7 engages in a central hole 37 of the hollow cylindrical part 36, an anti-friction bearing 39 being situated between the first output shaft 7 and the hollow cylindrical part 36 for absorbing the radial forces acting upon the flange-like collar 34 and the hollow cylindrical part 36.

The arrangement and configuration of the hollow cylindrical part 36 and of the anti-friction bearing 38 between the first output shaft 7 and the hollow cylindrical part 36 ensures an exact positioning of the parts relative to each other and a compact construction of the drive device 5.

Examining the construction of the electromagnetic clutch 39, it has an integral coil 39 which is located in an annular magnetic body 41 of U-shaped cross section.

The coupling element 31 is made in addition to the resilient element 35 with an annular guide element 42 of L-shaped cross section which is movably guided upon the magnetic body 41 of the electromagnetic clutch 30 rotatorily and in axial direction of the drive shaft 6, the guidance of the guide element 42 upon the magnetic body 41 being deviced so that a rotation movement of the drive shaft 6 be transmitted to the hollow cylindrical part 36, the resilient element 10 and also to the guide element 42, and can be carried out by the latter.

On the guide element 42 is fastened an annular transmission element 43 of at least almost U-shaped cross section, the guide element 42 and the transmission element 43 constituting the armature of the electromagnetic clutch 30. When the electromagnetic clutch 30 is supplied with current, the guide element 42 an the transmission element 43 are displaced in axial direction of the drive shaft 6 in direction of both output shafts 7, 8 along the guideways of the magnetic body 41 against a retaining force generating by a reversible deformation of the resilient element 35.

The second output shaft 8 is designed as a hollow shaft surrounding the first output shaft 7 and on its end facing the drive shaft 6 can be operatively connected with the coupling element 31 or a gearing 44 of the transmission element 43 so as to obtain a non-rotatable connection between the drive shaft 6 and the second output shaft 8 in currentless state of the electromagnetic clutch 30. The gearing 44 of the transmission element 43 is designed as an inner gearing extending over the whole periphery of the transmission element 43 and engaging in a spline of the second output shaft 8 formed on one end of the output shaft 8 which end faces the drive shaft 6 and expands in the manner of a funnel.

It obviously is at the expert's discretion to provide, instead of the form-locking connection between the transmission element 43 and the second output shaft 8, a force-locking connection such as a frictional connection via two friction faces. Besides, the non-rotatable connection can also be made, instead of via the gearing described, via one other suitable form-locking connection.

The first output shaft 7 is provided in the area of its end facing the drive shaft 6 with a collar 45 with which, in the current-supplied state of the electromagnetic clutch 30, contacts the coupling element 31 or the transmission element 43 so that a non-rotatable connection exists between the drive shaft 6 and the first output shaft 7 and the drive torque introduced via the drive shaft 6 is transmitted via the coupling element 31 to the first output shaft 7.

According to the design of FIG. 3, the collar 45 of the first output shaft 7 is designed as a separate flange-like part connected with the first output shaft 7 by a force fit. But the expert is allowed optionally to design the collar 45 integral with the output shaft 7, the same as to provide one other force-locking or form-locking connection—in any case non-rotatable—between the first output shaft 7 and the collar 45.

In current-supplied state of the electromagnetic clutch 30, the coupling element 31 or the guide element 42 and the transmission element 43 are compressed in axial direction to the collar 45 by the electric field produced by the integrated coil 39 of the electromagnetic clutch 30, the gearing 44 of the transmission element 43 being disengaged from the spline of the second output shaft 8. Thus, in current-supplied state of the electromagnetic clutch 30, the connection between the drive shaft 6 and the second output shaft 8 is cut off and a frictional engagement is created between the transmission element 43 and the collar 45 so that a power flow exists between the drive shaft 6 and the first output shaft 7 via the coupling element 31.

When the electromagnetic clutch 30 is not current-supplied, the transmission element 43 and the guide element 42 are displaced in axial direction of the drive shaft 6 from the collar 45 toward the coil 39 of the electromagnetic clutch 30 by the potential energy fed to the resilient element 35 when the electromagnetic clutch 30 is supplied with current. Thereby is cut off the frictional connection between the transmission element 43 and the collar 45 and the gearing 44 of the transmission element 43 again is engaged with the spline of the second output shaft 8.

In the area of the drive shaft, to discharge the drive device 5, an electromagnetic brake is provided with which the drive shaft, depending on a current supply of the electromagnetic brake 46, is non-rotatably kept in one position. The electromagnetic brake 46 has an integral coil 47, which coil 47 is situated in an annular magnetic body 49 designed with U-shaped cross section.

The electromagnetic brake 46 further comprises a brake element 50 non-rotatable with the drive shaft 6 and movable in axial direction of the drive shaft 6 which, in current-supplied state of the electromagnetic brake 46, forms a power flow between the drive shaft and the electromagnetic brake 46. When the electromagnetic brake 46 is not current-supplied, the brake element 50 is located in axial direction of the drive shaft 6 spaced from the coil 47 and the magnet body 19 of the electromagnetic brake 46. Due to the contact between the brake element 50 and the magnet body 47 of the electromagnetic brake 46 and a fastening of the magnet body 49 in a housing 51 of the drive device 5, the drive shaft 6 is kept via the electromagnetic brake 46 in a desired stationary position with applied torque without a drive torque or a counter-torque having to be applied by the drive device 5.

The applied torque acts upon the drive shaft 6 depending on the position of the electromagnetic clutch 30 of the first output shaft 7 or of the second output shaft 8 and of the multi-disc lock 4 or of the multiplication step 2. For the case that by the drive device 5 there should be applied a counter-torque that counteracts the torque applied on both output shaft 7, 8 or on one output shaft 7 or 8, the electromotor 9 of the drive device 5 could be permanently supplied with current. But this is undesired, since the permanent current supply of the electromotor 9 needed to maintain the counter-torque requires a high input of energy and would have the consequence of an undesired heating of the drive unit 5. This is successfully prevented by using the electromagnetic brake 46.

In order to cut off with certainty the frictional connection between the brake element 50 and the magnet body 49 of the electromagnetic brake 46 during transition from current-supplied to currentless state of the electromagnetic brake 46, there is provided between a shaft flange 52 of the drive shaft 6 and the brake element 49 one other resilient element 53 which, as result of the axial displacement of the brake element 50 in the current-supplied state of the electromagnetic clutch 46, undergoes a reversible deformation and stores potential spring energy. During transition to a currentless state of the electromagnetic brake 46, the stored energy leads to an axial displacement of the brake element 50 from the magnet body 49 of the electromagnetic brake 46 back to an idle position of the brake element 50. The shaft flange 52 is fixedly connected with the drive shaft 6 via a press fit and kept in axial direction of the drive shaft 6 by the recess 54 of the drive shaft 6.

The electromagnetic clutch 30, the same as the electromagnetic brake 46, is fixedly and immovably situated by its fixture 41 in the housing 51 of the drive device 5. With regard to their construction, the electromagnetic clutch 30 and the electromagnetic brake 46 are basically of the same kind, the electromagnetic fields produced having different effects upon the parts that surround them. The field of the electromagnetic clutch 30 thus produces an ejection of the coupling element 31 whereas the field of the electromagnetic brake 46 produces an attraction of the brake element 50 which constitutes the armature of the electromagnetic brake 46. The magnetic bodies 41, 49 are made of iron in order to make possible optimally to build the electromagnetic field.

The drive shaft 6 is supported in the housing 51 by a ball bearing 55 which absorbs axial forces acting upon the drive shaft 6. The second output shaft 8 is also rotatably supported in the housing 51 by a ball bearing 58, the first output shaft 7 being rotatably supported by the ant-friction bearing 38 in the hollow cylindrical part 36 and by two other anti-friction bearings 57A, 57B and an additional ball bearing 56 in the second output shaft 8.

The drive unit 5 comprises in this embodiment the housing 51 separately fastened on the housing 16 of the all-wheel distributor transmission 1. The arrangement of the drive unit 5 outside the transmission housing 16 makes possible both a simple construction of the drive unit 5 inasmuch as, for example, no cable seals have to be provided in the housing, and an easy assembly.

However, in another embodiment of the all-wheel distributor transmission, it is left to the expert, depending on the existing case, to integrate the drive device 5 without its own housing in the housing of the all-wheel distributor transmission.

Figure 4:
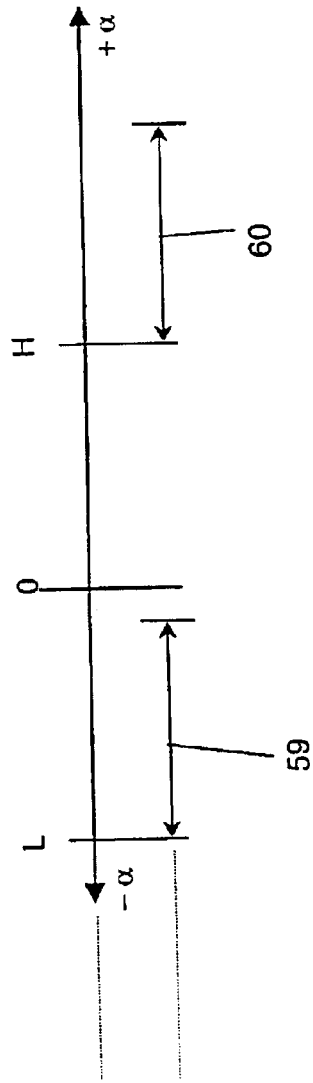
FIG. 4 is an extensively schematized representation of the control range of the drive device.

FIG. 4 shows an extensively schematized representation of the control range of the drive device 5 and of the electromotor 9 where a horizontal line with arrow points starting from a zero point "0" reproduces the two directions of rotation of the electromotor 9. On the operating point reproduced with "0" the electromotor 9 is stationary. Starting from this point, there takes place a rotation over the angle α in direction of an operating point H ("high") or an opposite direction over the angle −α in direction of a point L ("low"). The points L and H symbolize coupling points at which, in this case, takes place a shift of the electromagnetic clutch 30.

The area between the operating point "0" identifying a standstill and the coupling points L, H represents the control range of the first output shaft 7. On the coupling points L, H a change over is made to a control of the second output shaft 8, the control range of which attaches directly to the coupling points by the respective control ranges 59, 60 seen in FIG. 4.

In said control ranges 59, 60, the locking of the multi-disc lock 4 is controlled, an active control of the multi-disc lock 4 occurring in direction "+α" and in direction "−α" acting the adjusting system comprised of set wheel 23, rolling bodies 61 and the adjusting element 29. It is of particular advantage here that the control of the second output shaft 8 begins without idling speed range immediately after reaching the respective coupling points L and H.

In another embodiment it can also be provided that in the area of the ball-threaded pinion 12 a directional sensor be situated which indicates when the coupling points L and H are reached so that an associated electronic control unit can detect that it is possible immediately to start with the actuation of the second output shaft 8.

By uncoupling the drive of the multi-disc lock from the drive of the off-road gear actuation, there advantageously exists, in the shown embodiment of the all-wheel distributor transmission, one one-quadrant control range which by control technology is easy to operate.

REFERENCES 1 all-wheel distributor transmission
2 multiplication step
3 second planetary gear set
4 lock or multi-disc lock
5 drive device
6 drive shaft
7 first output shaft
8 second output shaft
9 electromotor
10 shift unit
11 linear drive
12 ball-threaded pinion
13 driver
14 ball
15 ball nut
16 housing of the all-wheel distributor transmission
17 synchronizer unit
18 multiplication device
19 shaft
20, 21 gear wheel
22 spur wheel of second output shaft
23 set wheel
23A recess
24 spline
25 inner discs
26 front-wheel output shaft
27 outer discs
28 rear-wheel output shaft 29 adjustment element
29A groove
30 electromagnetic clutch
31 coupling element
32 point of rotation
34 flange-like collar
35 resilient element
36 hollow cylindrical part
37 central hole
38 anti-friction bearing
39 integral coil of the electromagnetic clutch
41 magnetic body of the electromagnetic clutch
42 guide element
43 transmission element
44 gearing of the transmission element
45 collar
46 electromagnetic brake
47 integral coil of the electromagnetic brake
49 magnetic body of the electric brake
50 brake element
51 housing
52 shaft flange of the drive shaft
53 resilient element
54 recess of drive shaft
55, 56 ball bearing
57A, 57B anti-friction bearing
58 ball bearing
59, 50 control range
61 rolling body, ball

What is claimed is:

1. An all-wheel distributor transmission for a motor vehicle comprising a planetary gear set as a multiplication step (2) for a switchable off-road gear, a planetary gear set with variable division for distribution of a drive torque onto a front axle and a rear axle and a controllable lock to lock between the front axle and the rear axle, the lock and the multiplication step being actuatable via a controllable drive device (5), wherein the drive device (5) comprises one drive shaft (6), a first and second output shaft (7, 8), the first output shaft (7) being operatively connected with the multiplication step (2) and the second output shaft (8) being operatively connected with the controllable lock (4), and it being possible, depending on a control of a shift unit (10) for controlling the controllable lock (4) or the multiplication step (2), to bring a torque fed via the drive shaft (6) to the first or second output shaft (7 or 8).

2. The all-wheel distributor transmission according to claim 1, wherein the shift unit (10) has an electromagnetic clutch (30) with which can be produced by a power flow between the drive shaft (6) and the first or second output shaft (7 or 8).

3. The all-wheel distributor transmission according to claim 1, wherein the controllable lock (4) and the multiplication step (2) can be driven by the drive device (5) sequentially translatorily and can be kept in one position.

4. The all-wheel distributor transmission according to claim 1, wherein in the area of its end, remote from the drive shaft (6), the first output shaft (7) is in operative connection with a linear drive (11).

5. The all-wheel distributor transmission according to claim 4, wherein the linear drive (11) comprises a ball-threaded pinion (12) and a tiltable driver (13), the ball-threaded pinion (12) comprising a ball nut (15) in operative connection with the first output shaft (7) and having a plurality of balls (14) and which, during a rotation of the first output shaft (7), is adjusted in axial direction of the first output shaft (7) and produces a tiltable motion of the tiltable driver (13).

6. The all-wheel distributor transmission according to claim 5, wherein the tiltable driver (13) is tiltably supported in a housing (16) of the all-wheel distributor transmission (1) and connected with a synchronizer unit (17) in a manner such that a tilting motion of the tiltable driver (13) produces an actuation of the multiplication step (2).

7. The all-wheel distributor transmission according to claim 1, wherein on an end of the all-wheel distributor transmission remote from the one drive shaft (6), the second output shaft (8) is connected with the controllable lock (4) via a multiplication device (18).

8. The all-wheel distributor transmission according to claim 1, wherein the controllable lock (4) has a plurality of axially movable inner and outer discs (25, 27), the inner discs (25) of the controllable lock (4) being non-rotatably connected with a rear-wheel output shaft (28) of the all-wheel distributor transmission (1) and the outer discs (27) of the controllable lock (4) being non-rotatably connected with a front-wheel output shaft (26) of the all-wheel distributor transmission (1).

9. The all-wheel distributor transmission according to claim 8, wherein to adjust the controllable lock (4) there are provided a set wheel (23) and between the plurality of inner and outer disc (25, 27) and the set wheel (23) an adjusting element (29) axially movable and non-rotatably situated in a housing (16) of the all-wheel distributor transmission (1), the adjusting element (29) having on its side facing the set wheel (23) at least one groove (29A) for accommodating rolling bodies (61) which correspond with at least one recess (23A) upon the side of the set wheel (23) facing the adjusting element (29) in a manner such as to produce a rolling of the rolling bodies (61) and an axial motion of the adjusting element (29).

10. The all-wheel distributor transmission according to claim 7, wherein the multiplication device (18) has a first and second gear wheels (20, 21) fixedly connected with a shaft (19) and rotatably situated in a housing (16), the first gear wheel (20) being engaged with a spur gear (22) firmly connected with the second output shaft (8).

11. The all-wheel distributor transmission according to claim 9, wherein the controllable lock (4), for producing the operative connection with the second output shaft (8), is provided with a spline (24) extending at least partly over the periphery of the set wheel (23).

12. The all-wheel distributor transmission according to claim 10, wherein the second gear wheel (21) of the shaft (19) is engaged with a spline (24) of the set wheel (23).

13. The all-wheel distributor transmission according to claim 2, wherein the electromagnetic clutch (30) has an axially and rotatably movably guided coupling element (31) which is non-rotatably connected with the drive shaft (6) and depending on a current supply of the electromagnetic clutch (30) produces the power flow between the drive shaft (6) and the first or second output shaft (7 or 8).

14. The all-wheel distributor transmission according to claim 13, wherein the drive shaft (6) has at an end facing the output shafts (7, 8), a flange-like collar (34) on which is fastened a resilient element (35) of the coupling element (31).

15. The all-wheel distributor transmission according to claim 13, wherein the second output shaft (8) is designed as a hollow shaft surrounding the first output shaft (7) and on an end of the second output shaft (8) facing the drive shaft (6), the second output shaft (8) can be brought to operative connection with the coupling element (31) so that a non-rotatable connection exists between the drive shaft (6) and the second output shaft (8) when the electromagnetic clutch

(30) is currentless when the connection between the drive shaft (6) and the first output shaft (7) is released.

16. The all-wheel distributor transmission according to claim 13, wherein the first output shaft (7) has at an end facing the drive shaft (6) a collar (45) with which, in a current-supplied state of the electromagnetic clutch (30) contacts the coupling element (31) so that a non-rotatable connection exists between the drive shaft (6) and the first output shaft (7), the connection between the drive shaft (6) and the second output shaft (8) then being released.

17. The all-wheel distributor transmission according to claim 15, wherein to form the non-rotatable connection between the drive shaft (6) and the first or second output shaft (7 or 8), a form-locking or force-locking connection is respectively provided.

18. The all-wheel distributor transmission according to claim 1, wherein to unload the drive device (5), in the area of the drive shaft (6) an electromagnetic brake (46) is provided with which the drive shaft (6) is non-rotatably retained in one position depending on a current supply of the electromagnetic brake (46).

19. The all-wheel distributor transmission according to claim 18, wherein the electromagnetic brake (46) comprises a brake element (50) non-rotatable with the drive shaft (6) and movable in an axial direction of the drive shaft (6) which in current-supplied state of the electromagnetic brake (46) forms a power flow between the drive shaft (6) and the electromagnetic brake (46).

* * * * *